(12) United States Patent
Katsaros et al.

(10) Patent No.: US 11,479,013 B2
(45) Date of Patent: Oct. 25, 2022

(54) WATER-DRAINABLE AIR-BARRIER TAPE FOR BUILDINGS

(71) Applicants: DUPONT SAFETY & CONSTRUCTION, INC., Wilmington, DE (US); MOISTURE MANAGEMENT, LLC, Norwood Young America, MN (US)

(72) Inventors: James Dean Katsaros, Midlothian, VA (US); Christopher E. Fetterman, Richmond, VA (US); Mark Stender, Norwood, MN (US)

(73) Assignees: DUPONT SAFETY & CONSTRUCTION, INC., Wilmington, DE (US); MOISTURE MANAGEMENT LLC., Norwood Young America, MN (US)

( * ) Notice: Subject to any disclaimer, the term of this patent is extended or adjusted under 35 U.S.C. 154(b) by 0 days.

(21) Appl. No.: 16/910,751

(22) Filed: Jun. 24, 2020

(65) Prior Publication Data

US 2021/0402732 A1     Dec. 30, 2021

(51) Int. Cl.
| | |
|---|---|
| *B32B 3/24* | (2006.01) |
| *B32B 3/26* | (2006.01) |
| *C09J 7/29* | (2018.01) |
| *C09J 7/38* | (2018.01) |
| *B32B 27/12* | (2006.01) |

(Continued)

(52) U.S. Cl.
CPC .............. *B32B 3/266* (2013.01); *B32B 27/12* (2013.01); *B32B 27/304* (2013.01); *B32B 27/32* (2013.01); *C09J 7/29* (2018.01); *C09J 7/38* (2018.01); *B32B 2405/00* (2013.01); *C09J 2301/414* (2020.08); *C09J 2400/26* (2013.01); *C09J 2423/006* (2013.01); *C09J 2423/046* (2013.01); *C09J 2427/006* (2013.01); *C09J 2467/006* (2013.01); *C09J 2471/00* (2013.01); *Y10T 428/24273* (2015.01); *Y10T 428/24331* (2015.01)

(58) Field of Classification Search
CPC .................... Y10T 428/24347; B32B 3/266
See application file for complete search history.

(56) References Cited

U.S. PATENT DOCUMENTS

| | | | |
|---|---|---|---|
| 6,258,439 B1 * | 7/2001 | Hofmann | B29C 70/26 428/138 |
| 8,074,409 B2 | 12/2011 | Goldberg et al. | |

(Continued)

FOREIGN PATENT DOCUMENTS

GB     2130965 A     6/1984

OTHER PUBLICATIONS

PCT International Search Report, dated Oct. 6, 2021, International Application No. PCT/US2021/038630, Filing date Jun. 23, 2021, ISA European Patent Office, Catherine Vandeput, Authorized officer.

*Primary Examiner* — William P Watkins, III

(57) ABSTRACT

A laminate comprises a wicking fabric and a polymeric film adhered to both sides of the wicking fabric, wherein the wicking fabric comprises a plurality of holes, the polymeric films on both sides of the wicking fabric are fused together at each hole, and the laminate functions as an air barrier when measured in accordance with ASTM E2178-13, and allows the passage of liquid water as per ASTM E2273-18.

6 Claims, 3 Drawing Sheets

(51) Int. Cl.
*B32B 27/30* (2006.01)
*B32B 27/32* (2006.01)

(56) References Cited

U.S. PATENT DOCUMENTS

| | | |
|---|---|---|
| 8,201,361 B2 | 6/2012 | Koch et al. |
| 2003/0021952 A1 | 1/2003 | Zink et al. |
| 2005/0028455 A1 | 2/2005 | Koch et al. |
| 2020/0102735 A1 | 4/2020 | Ugliuzza |

* cited by examiner

WATER-DRAINABLE AIR-BARRIER TAPE FOR BUILDINGS

BACKGROUND OF THE INVENTION

1. Field of the Invention

This invention pertains to a laminate suitable for draining fluid such as water in building walls.

2. Description of Related Art

U.S. Pat. No. 8,201,361 B2 to Koch et al discloses a combination through-wall masonry flashing/drainage device having a flashing membrane with at least one reinforcing cloth adhered to at least one side of the flashing membrane. A wicking cloth made of a synthetic wicking material is then adhered to the device. The wicking cloth material is selected for wicking ability, life expectancy, mildew resistance, and strength characteristics.

U.S. Pat. No. 8,074,409 B2 to Goldberg et al teaches a wall assembly that includes a wall frame, a trough, a moisture transport spacer coupled to the wall frame and providing a substantial barrier to the passage of air and moisture vapor through the wall assembly, a moisture wicking sheet disposed at a bottom of the wall frame and extending from the moisture transport spacer to the trough, and an air seal disposed between the moisture wicking sheet and the bottom of the wall frame. The trough communicates with a dynamic ventilation system configured to remove moisture collected in the trough.

There is an ongoing need to provide solutions for facilitating water drainage from buildings while minimizing or eliminating air filtration into the building.

BRIEF SUMMARY OF THE INVENTION

A laminate comprises a wicking fabric and a polymeric film adhered to both sides of the wicking fabric, wherein
  the wicking fabric comprises a plurality of holes,
  the polymeric films on both sides of the wicking fabric are fused together at each hole, and
  the laminate functions as an air barrier when measured in accordance with ASTM E2178-13 and allows the passage of liquid water as per ASTM E2273-18.

DETAILED DESCRIPTION OF THE INVENTION

Laminate

Figure 1:
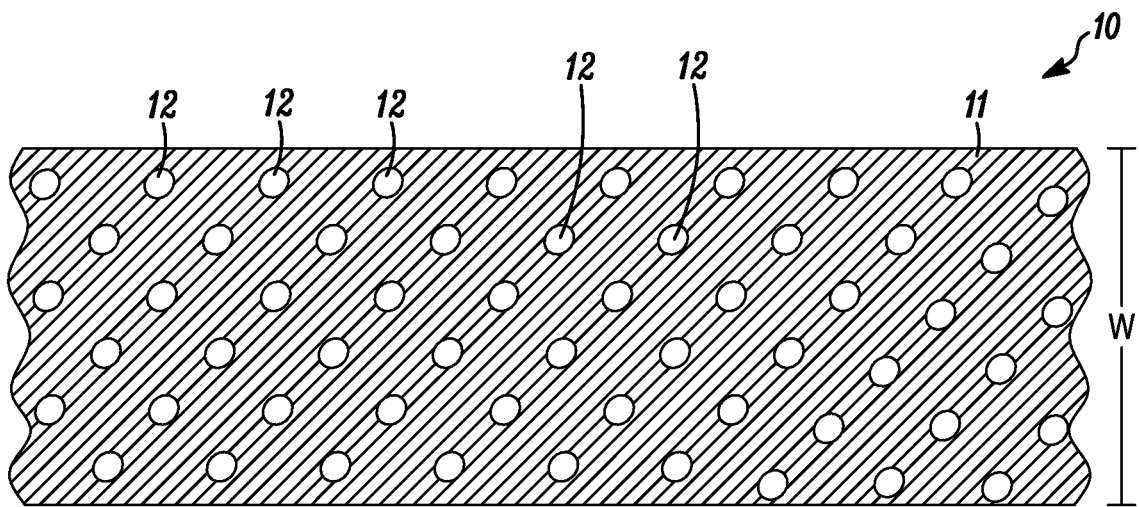
FIGS. 1 and 2 are front and end views respectively of one embodiment of a laminate of the invention.
Figure 2:
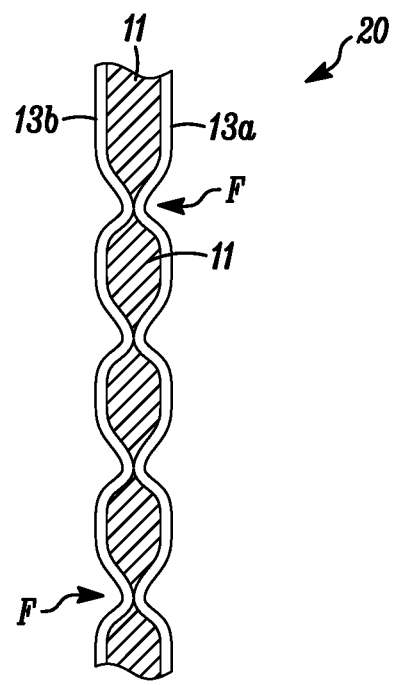
Figure 3:
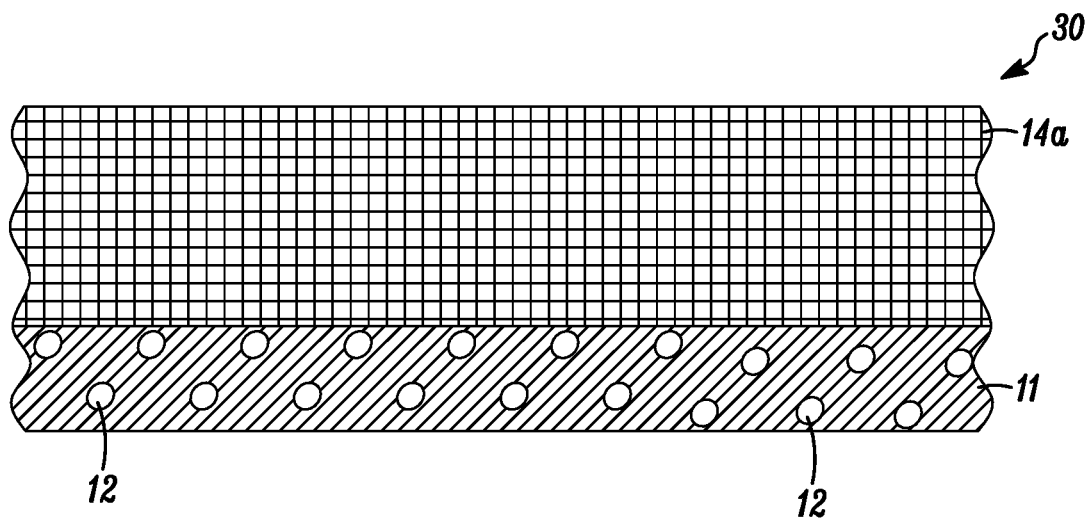
FIG. 3 is a front view of a second embodiment of a laminate of the invention.

FIGS. 1 and 2 show generally at 10 and 20 respectively front and end views of laminate comprising a wicking fabric 11 and polymeric films 13a and 13b adhered to both sides of the wicking fabric 11. The wicking fabric comprises a plurality of holes 12 wherein the polymeric films on both sides of the wicking fabric are fused together at each hole as shown at "F" in FIG. 2.

Preferably, the laminate is flexible. By flexible is meant that the laminate can be bent by hand without breaking.

Figure 4:
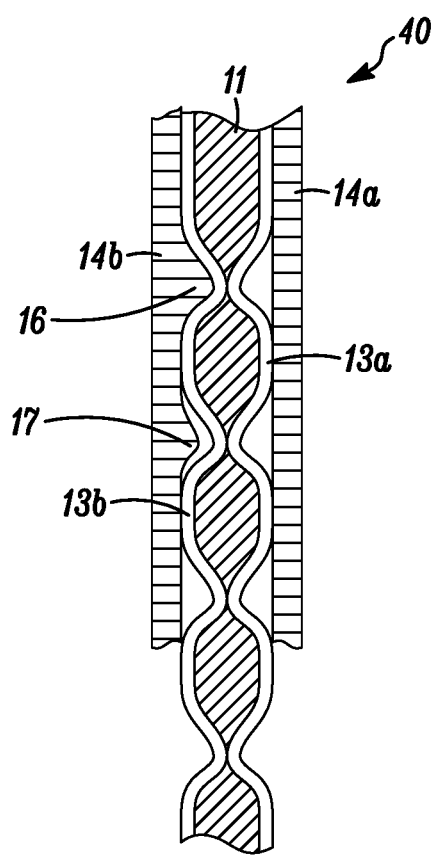
FIGS. 4 and 5 are end views of further embodiments of laminates of the invention.

The laminate may further comprise an attachment means at the outer surface of at least one of the polymeric films. Such attachments are shown at 14a and 14b in FIG. 4. The attachment means may be an adhesive such as a lap adhesive, a double-sided adhesive tape, a sealant or a silyl-terminated polyether.

The adhesive may further comprise a scrim. A scrim is a lightweight open weave fabric made from natural or synthetic yarns. In some embodiments, the adhesive may fully or partially fill the gap formed in the regions where the films fuse together, this being shown for example at 16 and 17 respectively in FIG. 4.

Figure 5:
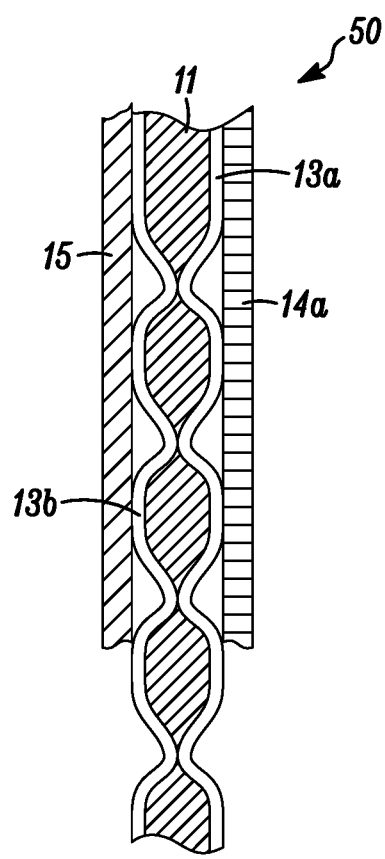

In a further embodiment as in FIG. 5, the laminate may comprise an attachment means 14a positioned on one outer surface of one of the polymeric films and a gasket 15 positioned on the outer surface of the other polymeric film. The gasket may be secured to the film by an adhesive. This structure is particularly suitable when the laminate is located at the front base of a window sill. In such circumstances, the gasket side of the laminate is always the external facing side. In one embodiment, an adhesive tape may optionally be applied to the wall prior to fitting the laminate. The gasket is compressed between the window appendage such as a flange and the drainage plate of the wall thereby creating an airtight seam.

When the laminate is used as part of a termination in the building envelope air and water barrier, the laminate is affixed to the building envelope component layers with one of the attachment means 14a. In some embodiments, housewrap sheeting such as Tyvek® or Typar® is placed over the laminate and attached to the other attachment means 14b. A building envelope is the physical separator between the conditioned and unconditioned environment of a building including the resistance to air, water, heat, light, and noise transfer.

A further optional feature is the inclusion of an adhesive between the wicking material and one or both films 13a and/or 13b.

As an alternative to a wicking fabric, a porous material such as a sponge can be utilized.

The laminate functions as an air barrier having an air leakage compliant with ASTM E2178-13 and allows the passage of liquid water as per ASTM E2273-18.

Wicking Fabric

In some embodiments, the wicking fabric is a fibrous wicking fabric, preferably of synthetic material. Exemplary synthetic materials include, polyester, polypropylene, polypropylene nylon or polyethylene. The fabric may have a thickness of from 1 to 10 mm (0.04 to 0.4 inches) and may have a basis weight of from 170 to 237 gsm (5 to 7 oz/sq.yd.). The fabric may be woven or nonwoven. The width "w" of the fabric, as per FIG. 1, is typically from about 12 mm (0.5 inch) to about 101 mm (4 inches), the choice of width being such as to ensure that the fluid passage and air leakage specifications are met.

Figure 6:
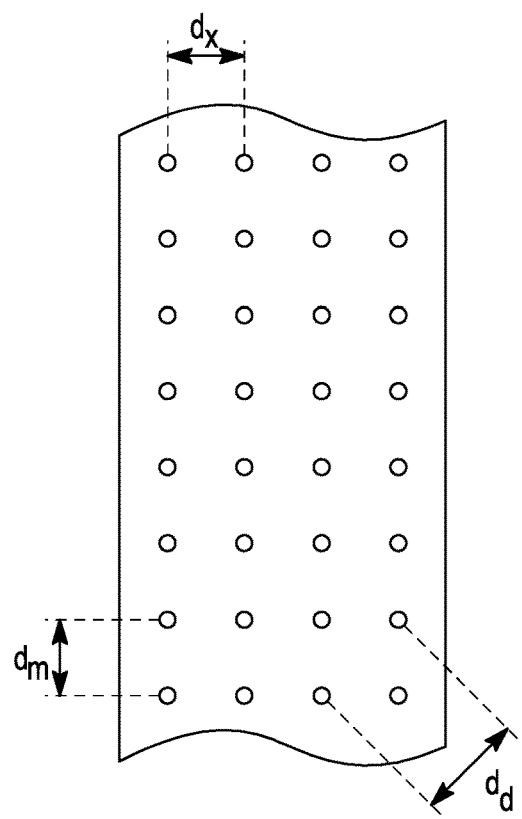
FIGS. 6 and 7 show planar views of hole patterns of exemplary fabrics.
Figure 7:
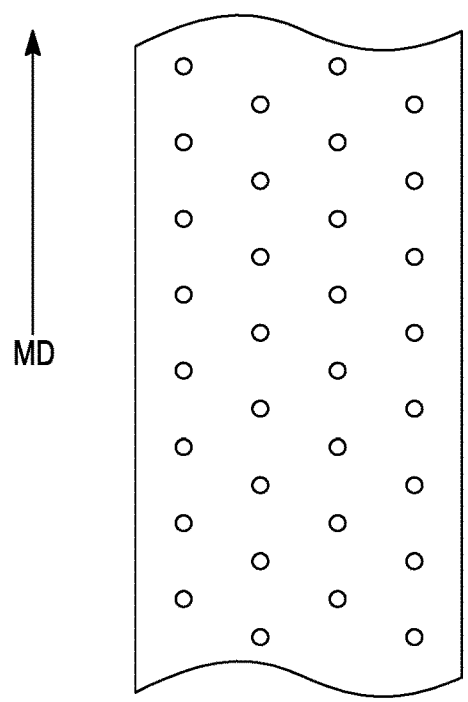

Preferably the holes are round, but other shapes such as squares or hexagons may also be utilized. FIGS. 6 and 7 show examples of suitable hole arrangements. In the above fabrics, one hole is separated from the next hole by a distance 'd'. In this context, adjacent rows of holes mean rows of holes that are next to each other. In FIGS. 6 and 7, the hole spacing may be between holes in the machine direction ($d_m$), between holes in the cross direction ($d_x$) or holes in a diagonal direction ($d_d$), whatever is the smallest. Machine direction (MD) is a well-known term and is the direction in which the fabric is formed on a machine. In some embodiments, as in FIG. 7, holes in one row may be offset with respect to holes in an adjacent row. A random arrangement of holes may also be envisaged. FIG. 6 shows rows of holes parallel and orthogonal to the machine direction. FIG. 7 shows rows of holes parallel and diagonal to the machine direction.

The function of the holes 12 is to bring the two films 13a and 13b together at fusion points. The hole size and location on the wicking fabric is selected to provide enough compression of the films on the wicking material to provide an air barrier while still facilitating sufficient drainage.

A hydrophobic agent may optionally be coated onto the fabric surface.

In another embodiment of the laminate, the wicking fabric is free of holes with the polymeric films 13a and 13b being merely heat sealed to the fabric, for example, by point bonding.

Polymeric Film

The polymeric film may be polyolefin such as low-density polyethylene (LDPE), ethylene copolymer, polyvinylchloride, polyvinylidene chloride (PVCD) or polylactic acid (BOPLA).

The invention claimed is:

1. A laminate comprising a wicking fabric and a polymeric film adhered to both sides of the wicking fabric, the laminate in the form of a water-drainable, air-barrier tape for buildings,
   the laminate further comprising an attachment means on the outer surface of at least one of the polymeric films for affixing the laminate to a building envelope, the attachment means including an adhesive, a sealant or silyl-terminated polyether on the outer surface of at least one of the polymeric films,
   wherein the wicking fabric comprises a plurality of holes, the polymeric films on both sides of the wicking fabric are fused together at each hole, and
   the laminate functions as an air barrier when measured in accordance with ASTM E2178-13 and allows the passage of liquid water as per ASTM E2273-18.

2. The laminate of claim 1 wherein the wicking fabric is a fibrous wicking fabric.

3. The laminate of claim 1 wherein one of the polymeric films comprises the further comprising an attachment means and a gasket is positioned on the outer surface of the other polymeric film.

4. The laminate of claim 1 wherein the polymeric film is polyolefin, ethylene copolymer, polyvinylchloride, polyvinylidene chloride or polylactic acid.

5. The laminate of claim 1 wherein the wicking fabric further comprises a hydrophobic agent coated onto the fabric surface.

6. A laminate comprising a wicking fabric and a polymeric film heat sealed to both sides of the wicking fabric, the laminate in the form of a water-drainable, air-barrier tape for buildings,
   the laminate further comprising an attachment means on the outer surface of at least one of the polymeric films for affixing the laminate to a building envelope, the attachment means including an adhesive, a sealant or silyl-terminated polyether on the outer surface of at least one of the polymeric films,
   wherein the laminate functions as an air barrier when measured in accordance with ASTM E2178-13 and allows the passage of liquid water as per ASTM E2273-18.

* * * * *